US011995590B2

(12) United States Patent
Kwasny et al.

(10) Patent No.: US 11,995,590 B2
(45) Date of Patent: May 28, 2024

(54) ACTIVITY INDEX RESOLVER SYSTEM AND WORKFLOW METHOD

(71) Applicant: State Farm Mutual Automobile Insurance Company, Bloomington, IL (US)

(72) Inventors: Lance Kwasny, Bloomington, IL (US); Brett Whitehead, Heyworth, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 61 days.

(21) Appl. No.: 17/680,057

(22) Filed: Feb. 24, 2022

(65) Prior Publication Data

US 2022/0270007 A1    Aug. 25, 2022

Related U.S. Application Data

(60) Provisional application No. 63/153,213, filed on Feb. 24, 2021.

(51) Int. Cl.
*G06Q 10/0633* (2023.01)
*G06F 16/22* (2019.01)
*G06Q 40/08* (2012.01)

(52) U.S. Cl.
CPC ..... *G06Q 10/0633* (2013.01); *G06F 16/2272* (2019.01); *G06Q 40/08* (2013.01)

(58) Field of Classification Search
CPC .......................... G06Q 40/08; G06Q 10/0633

USPC ........................................................ 705/4
See application file for complete search history.

(56) References Cited

U.S. PATENT DOCUMENTS

| 8,549,536 | B2 | 10/2013 | Vasil et al. |
| 9,811,791 | B2 | 11/2017 | Koerner et al. |
| 9,965,139 | B2 * | 5/2018 | Nychis ...................... G06F 8/38 |
| 10,679,160 | B1 | 6/2020 | Mcfeeters et al. |
| 2005/0149375 | A1 * | 7/2005 | Wefers ............... G06Q 10/0639 |
| | | | 705/7.26 |
| 2008/0306806 | A1 | 12/2008 | Van Wyk et al. |
| 2013/0104046 | A1 | 4/2013 | Casco-Arias Sanchez et al. |
| 2015/0106129 | A1 * | 4/2015 | Kinney ................. G06Q 40/08 |
| | | | 705/4 |
| 2015/0356475 | A1 * | 12/2015 | Rogers ............... G06Q 10/0633 |
| | | | 705/7.27 |
| 2019/0244302 | A1 * | 8/2019 | Levy ...................... G16H 10/60 |

* cited by examiner

*Primary Examiner* — Robert R Niquette
(74) *Attorney, Agent, or Firm* — Lee & Hayes, P.C.

(57) ABSTRACT

An Activity Index Resolver (AIR) system to resolve workflow operations can include a cloud-based system and an AIR front-end application. The AIR components can enable an API gateway configured to allow at least one application to connect to the AIR system and to provide a plurality of inputs to the AIR system. The AIR components can manage one or more databases associated with insurance policies and can generate a set of activity indexes to activities to be performed based on the plurality of inputs, which can be sorted according to role(s) authorized to perform respective activities from the set of activity indexes. The AIR components can provide a subset of the activities to be performed associated with the set of activity indexes according to a hierarchy of filters associated with an identified role.

19 Claims, 10 Drawing Sheets

Preferred Role: — 902
PL AUTO UNDERWRITER

Preferred Product: — 904
PRIVATE PASSENGER AUTO

Transaction — 906 / 908 / 910 Selected
- Cancelation
- Rewrite remainder of term
- Reinstatement
- Issuance
- Submission

912

Priority — 914 / 916 / 918 Selected
- Urgent
- Normal
- High

920

State — 922 / 924 / 926 Selected
- Alabama
- Arizona
- California
- Delaware
- Indiana
- Illinois

928

UW Issue — 930 / 932 / 934 Selected
- PA_SF: non-renewing in quoted
- PA_SF: add FR filing
- PA_SF: review DBA
- PA_SF: effective date 7 days prior
- PA_SF: extend coverage for named

936

Vehicle Use — 938 / 940 / 942 Selected
- Farm
- Business
- To work, school, pleasure < 30 mile
- To work, school, pleasure < 50 mile
- To work, school, pleasure > 50 mile

944

946 — Save     Clear All — 948

FIG. 9

ACTIVITY INDEX RESOLVER SYSTEM AND WORKFLOW METHOD

PRIORITY

This application claims priority to U.S. provisional patent application Ser. No. 63/153,213, filed Feb. 24, 2021, which is incorporated herein by reference.

TECHNICAL FIELD

The present disclosure relates to management of workflow related to insurance policies, particularly with respect to aggregating and filtering multiple activities or tasks from disparate records obtained from disparate sources with different processes into a single coherent workflow operation.

BACKGROUND

Traditionally computerized workflow associated with the insurance industry has relied on custom-programmed databases and programs to manage the myriad of tasks. Recently a vendor has provided a program that small companies can use to set up an insurance practice, i.e., POLICY CENTER. However, while it allows some minimal customization, such customizing still requires that the purchaser employ programmers and obtain authorization from the vendor to make the revisions. In addition, without customization, that product requires that all data be migrated to its database and is not scalable for a large national practice.

Accordingly, there is an opportunity to improve workflow related to insurance involving tasks from multiple disparate systems.

SUMMARY

This disclosure describes techniques, systems, methods, and computer-executable instructions on computer-readable media for managing workflow related to insurance policies, including dynamically aggregating and filtering multiple indexes to activities or tasks to be performed from disparate records obtained from disparate sources with different processes. The system can perform dynamic aggregating and filtering in real time responsive to input associated with an end user login. Moreover, while aspects of this disclosure are described in the context of insurance policies, the AIR system can be used to aggregate and filter activities or tasks other than those relating directly to insurance policies.

According to a first aspect, a policy management system can include one or more processors and one or more computer-readable media storing computer-executable instructions that, when executed by the one or more processing units, cause the one or more processing units to perform operations. The operations can include managing access to a plurality of databases associated with insurance policies. The operations can also include presenting an application programming interface (API) gateway configured to connect at least one application and enable storing, as a set of activity indexes, indexes to activities associated with the at least one application in a first database of the plurality of databases. The operations can also include receiving a plurality of inputs, in some instances the plurality of inputs can be associated with the insurance policies. The operations can also include identifying a subset of activity indexes to be performed based on the plurality of inputs. The operations can also include sorting activities in the subset of activity indexes. The operations can also include determining a selection from the subset of activity indexes according to authorization conferred with a role associated with a provider of the plurality of inputs. The operations can also include providing the selection of the subset of activity indexes to be performed according to a hierarchy of filters associated with the role associated with the provider of the plurality of inputs.

According to a second aspect, a computer-implemented method of resolving workflow operations from a plurality of disparate tools can include operations. The operations can include providing an application programming interface (API) gateway for at least one of an external application, a billing system, or a customer management system. The operations can also include obtaining a plurality of inputs via the API, wherein the plurality of inputs can include values to populate variables representing at least one of: a source system, an environment, an alias, or at least one role associated with login credentials. The values can also include insurance policy information obtained from a first database that houses policy data. The operations can also include identifying a subset of activity indexes to be performed from a set of activity indexes associated with the policy information. The operations can also include sorting activities represented in the subset of activity indexes. The operations can also include identifying at least one role associated with the login credentials. The operations can also include determining a selection from the subset of activity indexes according to a hierarchy of filters associated with at least one role associated with the login credentials. The operations can also include surfacing the selection via a user interface from which input indicating a choice of activities to be performed can be received.

According to a third aspect, one or more computing devices can include one or more processing units one or more computer-readable media storing computer-executable instructions that, when executed by the one or more processing units, cause the one or more processing units to present a graphical user interface on a screen associated with the computing device. The graphical user interface can include a plurality or areas associated with received login credentials, the plurality of areas including at least one of seven areas. The seven areas can include a first area configured to receive indication of a choice of a preferred role, a second area configured to receive indication of a choice of a preferred product, a third area configured to receive indication of a choice of a transaction type, a fourth area configured to receive indication of a choice of a priority level, a fifth area configured to receive indication of a choice of a state, a sixth area configured to receive indication of a choice of an underwriter issue, and a seventh area configured to receive indication of a choice of a type of vehicle use. The graphical user interface can also include an activation interface to cause the choice or choices associated with the plurality of areas to be submitted as input to an activity index resolver (AIR) system for the computing device to receive a selection of activity indexes to be performed from a set of activity indexes available to be performed consistent with the input.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), component(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIG. 9 is a block diagram that illustrates an example graphical user interface associated with an activity index resolver (AIR) system and workflow method according to various examples described herein.

DETAILED DESCRIPTION

Overview

An insurance company can offer and manage multiple types of insurance policies, including policies for businesses and/or for individual or personal policies. Some policies can be specific to one of those types, e.g., workers compensation insurance for businesses or homeowner's insurance for individuals, whereas others can represent corresponding coverage for both types such as automobile insurance, fire insurance, renter's insurance, life insurance, etc. In some instances, an insured party can have more than one insurance policy. For example, a business can have fire insurance to cover the building, automobile insurance to cover a company vehicle, and life insurance to cover a key executive.

The innovation described herein, termed an activity index resolver (AIR) system, can improve management of workflow related to insurance policies including integrating tasks from a plurality of existing programs. The innovation described herein can provide a flexible application programming interface (API) gateway through which existing and/or new programs can provide information associated with insurance policies and managing insurance policies. The innovation described herein can dynamically aggregate and filter multiple indexes to activities or tasks to be performed associated with insurance policies from disparate records obtained from disparate sources with different processes into a single coherent workflow operation. The system can perform dynamic aggregating and filtering in real time responsive to input associated with an end user login. Moreover, while aspects of this disclosure are described in the context of insurance policies, the AIR system can be used to aggregate and filter activities or tasks other than those relating directly to insurance policies.

Illustrative Environment

Figure 1:
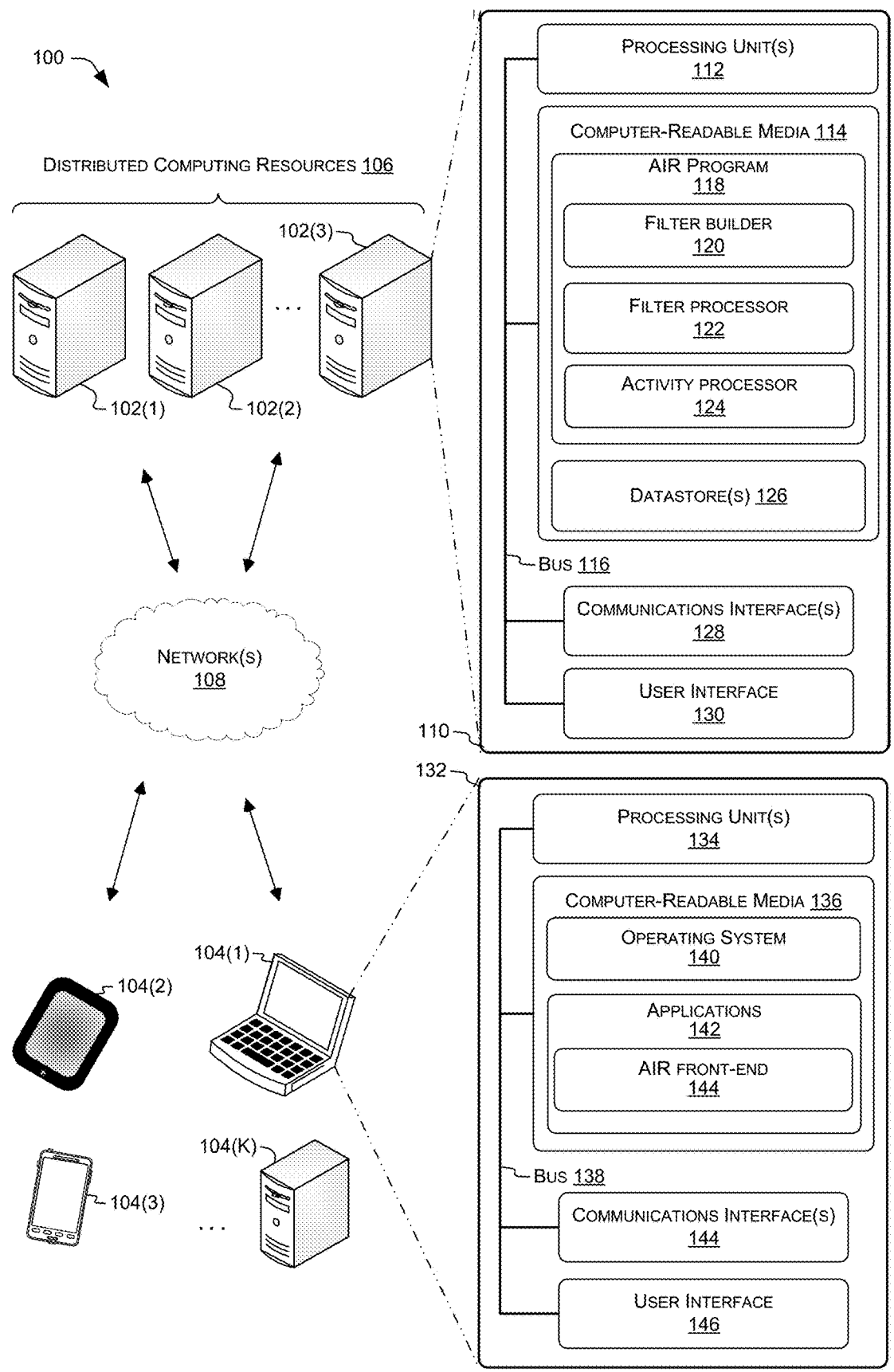
FIG. 1 is a block diagram depicting an example environment for implementing an activity index resolver (AIR) system and workflow method as described herein.

FIG. 1 shows an example environment 100 in which examples of an activity index resolver (AIR) system can operate and/or in which workflow methods associated with an AIR system such as those described herein can be performed. The illustrated environment includes computing device(s) 102(1)-102(N) (individually and/or collectively referred to herein with reference 102), where N is any integer greater than and/or equal to 1. The computing device(s) 102 can include server(s) and/or desktop computer(s), for example. The illustrated environment also includes computing devices 104(1)-104(K) (individually and/or collectively referred to herein with reference 104), where K is any integer greater than and/or equal to 1. In some examples, N=K; in other examples, N>K or N<K. The computing devices 104 can include, for example, laptop computer(s), tablet computer(s), hybrid computing device(s), and/or smart phone(s) configured to receive an end-user login. Computing device(s) 102 and/or 104 can include a diverse variety of device categories, classes, and/or types and are not limited to any of the particular types of devices illustrated.

In the illustrated example, computing device(s) 102(1)-102(N) can be computing nodes of distributed computing resources 106, e.g., in a computing cluster, such as a cloud service such as MICROSOFT AZURE, VMWARE VCLOUD, RACKSPACE, Inc.'s OPENSTACK, AMAZON WEB SERVICES (AWS), IBM SMARTCLOUD, ORACLE CLOUD, etc. In the illustrated example, computing device(s) 104 can include consumer devices and in some instances can operate as clients of distributed computing resources 106 that can submit jobs to distributed computing resources 106 and/or receive job results from distributed computing resources 106. Computing devices 102(1)-102(N) in distributed computing resources 106 can, share resources, balance load, increase performance, and/or provide fail-over support and/or redundancy, etc. Computing devices 104 can additionally or alternatively operate in a cluster and/or grouped configuration via association with one or more user(s).

By way of example and not limitation, computing device(s) 102 can include, but are not limited to, server computers and/or blade servers such as Web servers, map/reduce servers and/or other computation engines, and/or network-attached-storage units (e.g., 102(1)). By way of example and not limitation, computing device(s) 104 can include, but are not limited to, laptop computers (e.g., 104(1)), tablet computers (e.g., 104(2)), tablet hybrid computers 104(3), desktop (e.g., 104(K)), and/or other telecommunication devices, desktop computers, and/or integrated components for inclusion in computing devices, appliances, and/or other computing device(s) configured to initiate, participate in, and/or carry out a workflow method associated with an AIR system as described herein.

In some examples, as indicated, computing device(s), e.g., computing devices 102 and 104, can intercommunicate to initiate, participate in, and/or carry out workflow methods associated with an AIR system as described herein. For example, a computing device 104 configured to receive an end-user login can be a query and/or data source and computing device 102 can host modules and/or components of an AIR system to store data, to be queried, and/or to provide workflow to manage insurance policies as described below with reference to, e.g., FIGS. 2-10.

Different devices and/or types of computing devices 102 and 104 can have different needs and/or ways of interacting with distributed computing resources 106. For example, computing devices 104 can interact with distributed computing resources 106 with discrete request/response communications, e.g., issuing requests for responses and/or updates to manage workflow related to insurance policies. Additionally, and/or alternatively, computing devices 104 can be query sources and/or data sources and can interact with distributed computing resources 106 with discrete and/or ongoing transmissions of data to be used as input to an activity index.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, FIBRE CHANNEL switches and/or hubs, etc.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware components and/or software modules.

Illustrated computing device 102 can include one or more processing unit(s) 112, e.g., integrated electronic circuit(s) operably connected to one or more computer-readable media 114, e.g., memories, such as via a bus 116. In some examples, a plurality of processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Processing unit(s) 112 can include one or more microprocessors, single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computer-readable media described herein, e.g., computer-readable media 114, includes digital storage media also termed non-transitory computer-readable media, and/or communication media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to digital storage media also termed non-transitory computer-readable media, communication media can embody computer-readable instructions, data structures, program modules, and/or other data in a modulated data signal, such as a carrier wave, and/or other transitory transmission mechanism. As defined herein, digital storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 112, e.g., a CPU, graphics processing unit (GPU), and/or hardware logic device, can be incorporated in computing device 102, while in some examples at least one processing unit 112, e.g., one or more of a CPU, GPU, and/or hardware logic device, can be external to computing device 102.

Computer-readable media 114 can store, for example, computer-executable instructions of programs, and/or applications that are loadable and executable by processing unit(s) 112 such as an operating system and/or AIR program 118, and/or other modules. In various examples, computer-readable media 114 can store, computer-executable instructions of a filter builder module or component 120, a filter processor module or component 122, and/or an activity processor module or component 124, each of which can be associated with an AIR program 118. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to workflow management associated with the AIR program 118, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system and/or AIR program 118, and one or more of the filter builder module or component 120, the filter processor module or component 122, and/or the activity processor module or component 124.

Computer-readable media 114 can also store, for example, one or more datastore(s) 126. Datastore(s) 126 can include multiple disparate databases or data sources. For example, the AIR program can store and/or access digital records associated with insurance policies in one or more datastore(s) 126. In at least one example, filter builder module or component 120, filter processor module or component 122, and activity processor module or component 124 associated with an AIR program 118 can perform data analysis and/or processing on input from the multiple disparate data sources to generate an integrated workflow of activities that are appropriate for completion by a user login associated with a role.

Bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 112 to one or more computer-readable media 114.

Computing device 102 can also include one or more communications interfaces 128 connected via the bus 116 to processing unit(s) 112 to enable wired and/or wireless communications between computing device(s) 102 and other networked computing devices 102 and/or 104 involved in workflow methods associated with an AIR program 118, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, 5G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other modules or components are omitted from the illustrated computing device 102(3).

As noted above, computer-readable media 114 of the computing device 102 can store an operating system and/or AIR program 118. In some examples, an operating system is not used (commonly referred to as a "bare metal" configuration). In some examples, the operating system and/or AIR program 118 can include modules or components that enable and/or direct the computing device 102 to receive data via various input interfaces (e.g., user controls, network and/or communications interfaces, memory devices, and/or sensors), and process the data using the processing unit(s) 112 to generate output. The operating system and/or AIR program 118 can further include one or more modules or components that present the output (e.g., display an image on an electronic screen, store data in memory, and/or transmit data to another computing device). The operating system and/or AIR program 118 can enable a developer or an engineer, to interact with the computing device 102 using a user interface. User interface(s) (UI)s described herein can include one or more of a graphical user interface (GUI), and audio user interface (AUI), and/or various other input/output interfaces generally referenced as UI including touch-input interfaces and the like. Additionally, the operating system and/or AIR program 118 can include modules or components that perform various functions generally associated with an operating system, e.g., storage management and internal-device management.

In some examples, computing device 102 can include a user interface 130 configured to permit a developer or an engineer responsible for computing device 102(3), distributed computing resources 106, environment 100 and/or an application administrator, to operate the AIR program 118 via associated modules and/or components such as a filter builder module or component 120, a filter processor module or component 122, and/or an activity processor module or component 124 and/or to access the datastore(s) 126.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more digital storage media or communications media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Other applications in applications 142 can be operable with an AIR front-end application 144 to receive an end-user login among other input. Some examples of operating system 140 are discussed above with reference to inset 110.

In some examples, the computing device 104 can be configured to communicate with distributed computing resources 106 and/or computing device(s) 102 via a communications interface 146. An AIR front-end application 144 on computing device 104 can enable management of one or more types of insurance policies. AIR front-end application 144 can issue a query to and/or request information from datastore 126 and can perform techniques associated with managing workflow. For example, after receiving an end-user login, the computing device 104 can transmit a request to distributed computing resources 106 and/or computing device(s) 102 for an integrated output of a selection of activity indexes to be performed associated with insurance policies. Responsive to requests, an AIR innovation as described can receive output from distributed computing resources 106 and/or computing device(s) 102 as input for presentation from AIR front-end-application 144 via communications interface 146. An AIR innovation as described can present a user interface 148 associated with the AIR front-end-application 144 based on that input. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate one or more hidden layers and/or output layers of one or more neural network(s). In some examples, the computing device(s) 104 can obtain parameters associated with managing insurance policies and the distributed computing resources 106 and/or computing device(s) 102 can perform optimization and/or filtering of associated activities using those parameters via an optimization and/or filtering algorithm associated with AIR program 118.

Computing device 104 can also include one or more communications interfaces 146 connected via the bus 138 to processing unit(s) 134 to enable wired and/or wireless communications between computing device(s) 104 distributed computing resources 106 and/or and other networked computing devices 102 and/or 104 involved in end-to-end RNN for joint language understanding and dialogue management, and/or other computing device(s), over network(s) 108. Some examples are discussed above with reference to communications interface(s) 128.

Computing device 104 can include a user interface 148. For example, computing device 104(4) can provide user interface 148 to control and/or otherwise interact with AIR front-end application 144, distributed computing resources 106, and/or computing devices 102. For example, processing unit(s) 134 can receive inputs e.g., typed and/or spoken queries, selections, and/or other input actions associated with managing insurance policies via user interface 148 and transmit corresponding data via communications interface(s) 146 to computing device(s) 102.

User interfaces 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a joystick controller, a voice input device such as a microphone, voice-recognition device, and/or speech-recognition device, a touch input device such as a touchscreen and/or a touch pad, a gestural and/or motion input device such as a depth camera, a grip sensor, an accelerometer, another haptic input, a visual input device such as one or more cameras and/or image sensors, a QR code or bar code scanner, and the like. User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Filter builder 120 can be configured to dynamically create filters according to the input received. Filter processor 122 can be configured to receive one or more filters from filter builder and consolidate activities associated with multiple policies or types of coverage using keep-together logic.

In other examples, the target policy 104 can be a policy that is actively being managed by the policy management system, while the source policy 106 is a new policy or an existing policy that is being migrated to the policy management system from another source. For example, the source policy 106 may be a previously existing policy that is being migrated to the policy management system from a different legacy system, while the target policy 104 may be another policy that was migrated from the legacy system to the policy management system at an earlier point in time.

In some examples, a policy may be migrated from a legacy system, or other system, to the policy management system at a point in time tied to an upcoming renewal of the policy for a subsequent term.

Policy data for an automobile insurance policy can include one or more of: a client identifier, a policy number, an insurance company identifier, an insurance agent identifier, an address, a vehicle identifier, mandatory coverage information, vehicle use information, and/or other types of information such as a guaranteed renewal status, a term, a term length, renewal dates, driver exclusions, billing methods, billing accounts, etc. Policy data for other types of insurance policies may include similar types of information relevant to the other types of insurance policies.

Illustrative Framework

The order in which the operations are described in each example flow diagram and/or process is not intended to be construed as a limitation, and any number of the described operations can be combined in any order and/or in parallel to implement each process. Moreover, the components shown in each of FIGS. 2, 3, 4, 5, and 6 can be implemented in hardware, software, and/or a combination thereof. In the context of software, the modules or components represent computer-executable instructions that, when executed by one or more processing unit(s), cause one or more processing unit(s) to perform operations. In the context of hardware, the components represent circuitry to perform logic functions implemented, e.g., datapath-control, finite-state-machine sequencing functions, etc.

Figure 2:
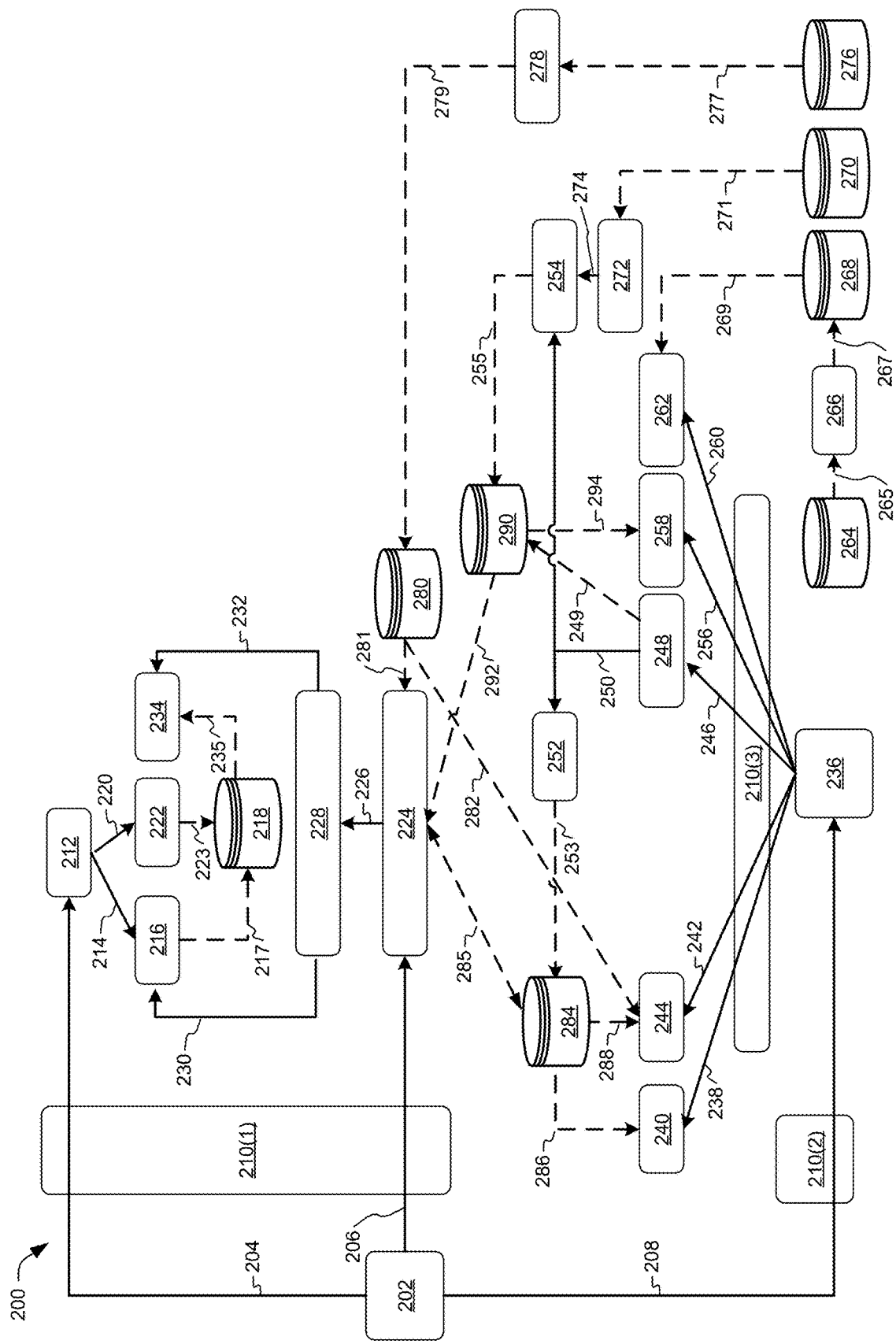
FIG. 2 is a block diagram depicting an example framework for implementing an activity index resolver (AIR) system and workflow method as described herein.

FIG. 2 is a block diagram depicting an example framework 200 for implementing an activity index resolver (AIR) system and workflow method as described herein.

Block 202 illustrates an example source application. In at least one example, the source application can include a vendor-provided application, which can be customized to operate as part of the AIR system. A source application can provide a variety of inputs including indications of a source system, a PC environment, an alias, one or more user roles, etc. Line 204 represents an example workflow subroutine to add activities associated with insurance policies in the AIR system. Line 206 represents an example workflow subroutine to request work associated with insurance policies in the AIR system. Line 208 represents an example workflow subroutine to apply filters associated with insurance policies in the AIR system.

Block(s) 210(1), 210(2), and 210(3) (individually and/or collectively referred to herein with reference 210), illustrate example API gateway(s) to control communications into and out of cloud-based parts of the AIR system. API gateway(s) 210 can provide a layer of security for cloud-based parts of the AIR system by blocking malicious network traffic and unauthorized types of communication.

Block 212 illustrates an example activity processor module, which in some examples can correspond to activity processor 124. Activity processor 212 can provide an API interface to manage records for insurance policies including adding and deleting records from one or more databases. For example, activity processor 212 can receive a record of activities to be added to insurance policies via workflow subroutine 204. Activity processor 212 can send instructions to delete an activity via an example workflow subroutine 214 to an example delete activity module 216. Dashed line 217 illustrates an example of data identified for deletion being sent to an example activity index database 218, which can represent a database from datastore(s) 126. Activity processor 212 can send instructions to add an activity via an example workflow subroutine 220 to an example add activity module 222. Dashed line 223 illustrates an example of data identified to be added being sent to an example activity index database 218.

Block 224 illustrates an example filter builder module, which in some examples can correspond to filter builder 120. Filter builder 224 can provide an API interface to receive requests for work associated with insurance policies. Filter builder 224, 120 can be configured to dynamically create filters according to the input received. For example, filter builder can receive a request for work associated with insurance policies via workflow subroutine 206. Requests for work can include a plurality of inputs including indications of a source system, a PC environment, an alias, one or more user roles, etc. Based on the plurality of inputs, filter builder 224 can determine what criteria should be applied and build one or more filter(s) to parse activities in the activity index database 218 to identify available activities to be returned in response to the request for work 206. Line 226 illustrates an example workflow subroutine to provide built filter(s) to filter processor 228.

Block 228 illustrates an example filter processor module, which in some examples can correspond to filter processor 122. Filter processor 228 can receive filter(s) to process requests for work associated with insurance policies from filter builder 224. Filter processor 228, 122 can be configured to receive one or more filters from filter builder and consolidate activities associated with multiple policies or types of coverage using keep-together logic. Filter processor 228 can parse activities in the activity index database 218 to identify activities that comply with the filter(s) to be returned in response to the request for work 206. In instances where the request for work 206 includes a request to delete one or more activities, such as when an insurance policy is not renewed, line 230 illustrates a workflow subroutine for filter processor 228 to pass that instruction to delete activity module 216. Line 232 illustrates an example workflow subroutine for filter processor 228 to provide activities for selection to a select activity module as illustrated by block 234. Dashed line 235 illustrates example data being provided from activity index database 218 to select activity module 234. In at least one example, this can represent a system process triggered in the workflows and/or by a request such as from source application 202 to get the next activity to work.

Block 236 illustrates an example AIR front-end application, which in some examples can correspond to AIR front-end application 144. In at least one example, AIR front-end application 236 can initiate subroutines to determine roles, products, filter(s), and selected attributes responsive to input received via the workflow subroutine to apply filters 208.

AIR front-end application 236 can issue instructions to determine a preferred role via an example workflow subroutine illustrated by line 238 to an example preferred role processor 240. AIR front-end application 236 can issue instructions to determine a preferred product via an example workflow subroutine illustrated by line 242 to an example preferred product processor 244. AIR front-end application 236 can issue instructions to determine preferred filter(s) via an example workflow subroutine illustrated by line 246 to an example preferred data processor 248. Dashed line 249 illustrates example filter data to be deleted from an activity filter table database. AIR front-end application 236 can issue instructions to provide preferred filter(s) via a workflow subroutine illustrated by line 250. Workflow subroutine 250 can provide preferred filter(s) to an add user role processor 252 and a write filter data processor 254. Dashed line 255 illustrates example filter data being provided from write filter data processor 254 to be stored in an activity filters database. AIR front-end application 236 can issue instructions to identify personal filter(s) via an example workflow subroutine illustrated by line 256 to an example find personal filter processor 258. AIR front-end application 236 can issue instructions to identify product attributes via an example workflow subroutine illustrated by line 260 to an example product attribute processor 262.

An AIR system can be associated with and receive data from a variety of databases having a variety of structures, and at least some of these databases can be hosted in the cloud. For example, database 264 illustrates an example enterprise allowed value system (EAVS) database, which can represent a parquet file database among other database structures. Dashed line 265 illustrates example data to be used in a simulation being provided from (EAVS) database 264 to EAVS simulator processor 266. EAVS simulator processor 266 can provide data as shown by dashed line 267 to be stored in a product attributes allowed values database 268. Product attributes allowed values database 268 can provide data as shown by dashed line 269 to a product attribute processor. A primary (master)/sort filter database 270 can provide data as shown by dashed line 271 to a get filter java script object notification (JSON) 272. The get filter JSON 272 can send instructions to identify product attributes via an example workflow subroutine illustrated by line 274 to the write filter data processor 254.

In examples, a primary (master) role to product database 276 can provide data as shown by dashed line 277 to a load roles-product processor 278. The load roles-product processor 278 can provide data as shown by dashed line 279 to be stored in a role-to-product map table database 280. The role-to-product map table database 280 can provide data as shown by dashed line 281 to the filter builder processor 224. The role-to-product map table database 280 can also provide data as shown by dashed line 282 to the preferred product processor 244, which can also receive data from a role preference table database 284. Role preference table database 284 can communicate data as shown by dashed line 285 (send and receive) with filter builder processor 224. Role preference table database 284 can also send data as shown by dashed line 286 to preferred role processor 240 in addition to providing data as shown by dashed line 288 to preferred product processor 244. An activity filter table database 290 can provide data 292 to the filter builder processor 224. The activity filter table database 290 can also provide data as shown by dashed line 294 to the find personal filter processor 258. Additional aspects of example components introduced in FIG. 2 are discussed in greater detail in FIGS. 3-6.

Figure 3:
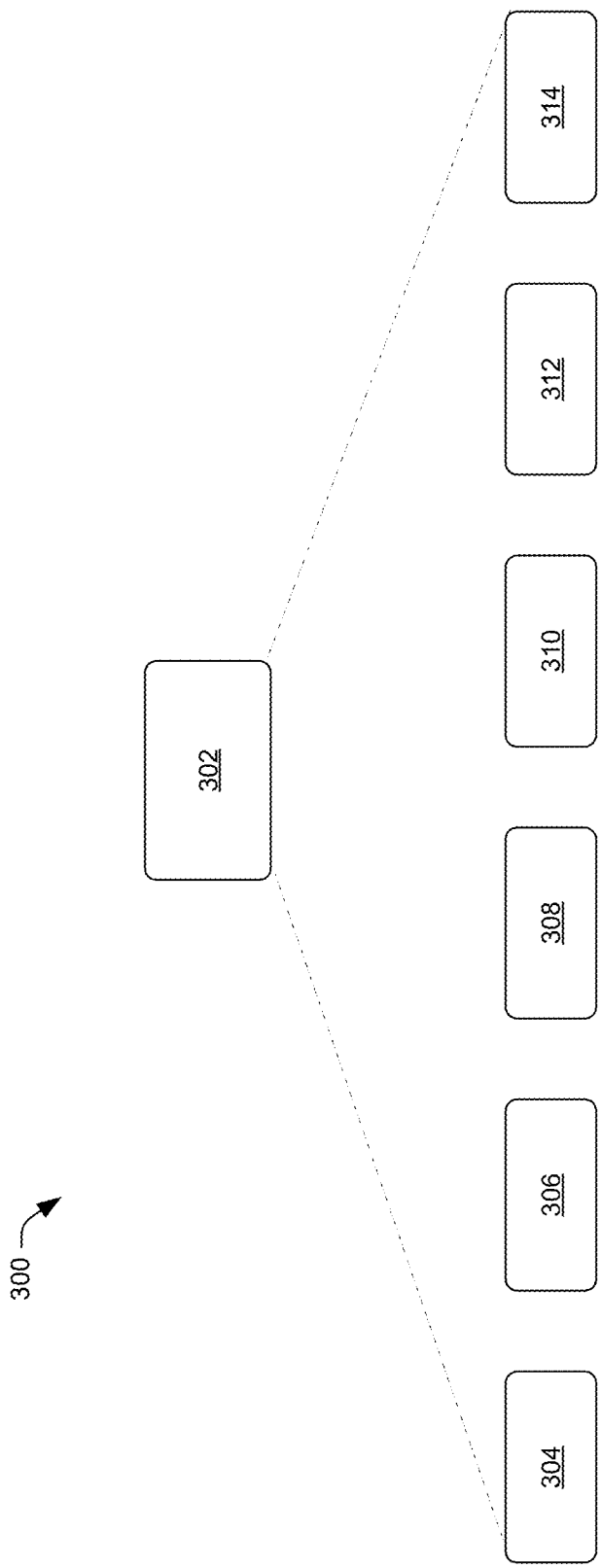
FIG. 3 is a block diagram depicting an example framework that can be associated with part of the framework from FIG. 2 according to various examples described herein.

FIG. 3 is a block diagram depicting an example framework 300 that can be associated with the AIR front-end application part of the framework from FIG. 2 according to various examples described herein.

Block 302 illustrates an example AIR front-end application, which in some examples can correspond to AIR front-end application 236, 144. In addition to receiving input from a source application, such as source application 202, in some examples, AIR front-end application 302 can serve as a portal accessible by users, such as via the Internet, without requiring an intermediate source application such as 202. In various examples, AIR front-end application 302 can be associated with a variety of interfaces and/or web pages to implement an AIR system as described herein.

Examples of interfaces and/or web pages to implement an AIR system can include one or more of the following. In various examples, functionality described can be available through one or more of the interfaces described, and one or more of the interfaces described can be combined, and/or other interfaces can be included. Block 304 illustrates an example interface to receive a personal filter indication. In examples, block 304 can represent an interface to update or replace personal filter files, e.g., to update a corresponding row in role preference table database 284, which can allow real-time changes to a database such as role preference table database 284, bypassing the typical need to access via an AWS console. In some examples, the AIR system may generate a backup of the corresponding row on demand as part of the update or replace process associated with block 304.

Block 306 illustrates an example interface to edit a role-product map. In examples, block 306 can represent an interface to edit and/or replace records in a corresponding database, such as role to product map database 280. Block 306 can allow real time changes to a database such as role to product map database 280, bypassing the typical need to access via an AWS console. In some examples, the AIR system may generate a backup of the corresponding row on demand as part of the edit and/or replace process associated with block 306.

Block 308 illustrates an example interface to receive an overview of activities. In examples, block 308 can represent an interface to obtain a report of activities associated with the AIR system. For example, block 308 can provide an interface to request and/or receive numerical data associated with selectable and/or designated activity groupings.

Block 310 illustrates an example interface to edit a primary (master)/sort filter. In examples, block 310 can represent an interface to edit and/or replace records in a corresponding database, such as primary (master)/sort filter database 270. Block 310 can allow real time changes to a database such as primary (master)/sort filter database 270, bypassing the typical need to access via an AWS console. In some examples, the AIR system may generate a backup of the corresponding row on demand as part of the edit and/or replace process associated with block 310.

Block 312 illustrates an example interface to edit an alias filter. In examples, block 312 can represent an interface to edit and/or replace records in a corresponding database, such as role preference database 284, activity filter table database 290, etc. Block 312 can allow real time changes to a database such as role preference database 284, activity filter table database 290, etc., bypassing the typical need to access via an AWS console. In some examples, the AIR system may generate a backup of the corresponding row on demand as part of the edit and/or replace process associated with block 312.

Block 314 illustrates an example interface to access support tools. For example, block 314 can represent an interface to one or more utilities to manage data within the AIR system such as, delete functionality, get functionality, master controls functionality, search functionality, etc. Example delete functionality provided via the interface can include options to delete one or more records for a variety of reasons including a controlled bulk delete for records identified as having a related defect or error scenario in production. Example get functionality provided via the interface can include options for producing a next activity next activity for a specified user and role for auditing purposes and to ensure that filters associated with the AIR system are working correctly. Example master controls functionality provided via the interface can include options to re-upload various databases including enterprise allowed value system (EAVS) database 264, product attributes allowed values database 268, primary (master)/sort filter database 270, primary (master) role to product database 276, etc. Block 314 can allow real time changes to a database while bypassing the typical need to access via an AWS console. Example search functionality provided via the interface can include options for searching such as to identify a specific activity, which can include a small subset search. Search keys can include one or more of policy type, policy number, insured name, insured mailing address, insured property address, automobile type, driver identification, etc. In some examples such can identify if an issue arises with keep together logic.

Figure 4:
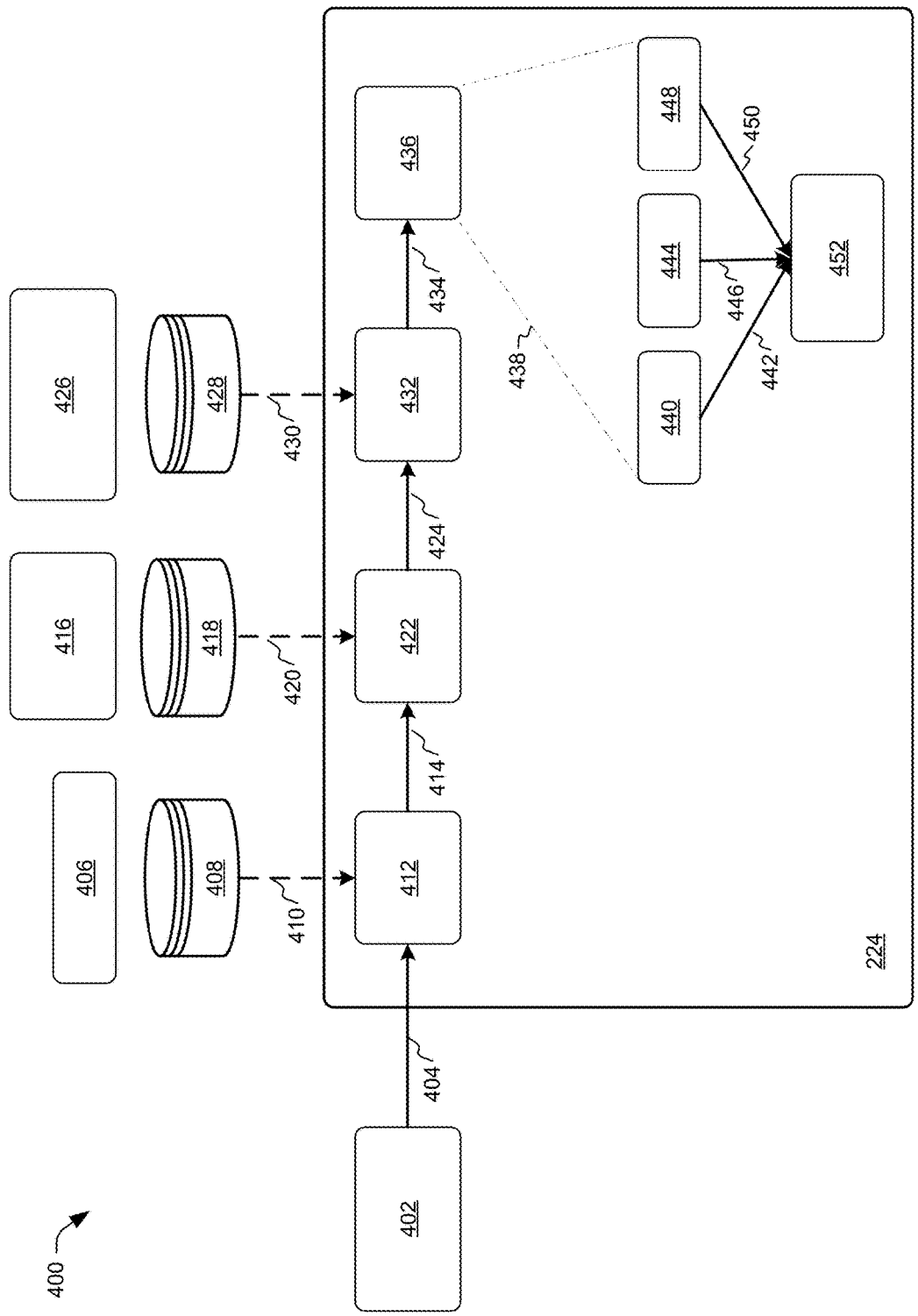
FIG. 4 is a block diagram depicting an example framework that can be associated with part of the framework from FIG. 2 according to various examples described herein.

FIG. 4 is a block diagram depicting an example framework 400 that can be associated with the filter builder module 224 part of the framework from FIG. 2 according to various examples described herein.

Block 402 illustrates example values received by filter builder 224, 120. In at least one example, values can include data to populate four variables. The four variables can include a source system, an environment, an alias, and at least one role, although many other variables are possible. In at least one example, the variables and their associated values can take the form represented in Table 1.

TABLE 1

| Variable | Value |
|---|---|
| sourceSystem | PL-Auto |
| pcEnvironment | DEV |
| alias | 0000 |
| userRoles | Auto Underwriter, Holds Admin |

The example values in Table 1 include a source system associated with personal-line (individual) automotive insurance, though other examples could represent personal-line (individual) fire insurance, personal-line (individual) homeowner's insurance, personal-line (individual) renter's insurance, personal-line (individual) life insurance, etc. and/or business-line automotive insurance, business-line fire insurance, business-line liability insurance, business-line renter's insurance, business-line life insurance, etc.

The example values in Table 1 also include an environment associated with a developer, though other examples could represent an environment associated with one or more of, development (shown), acceptance, clock, console, data, infra, local workstation, mock, operations, performance, test, system, work in progress, etc. The example values in Table 1 also include an alias associated with a login credential, e.g., a user identifier, which is shown as a numeric value "0000," although other examples could include alpha numeric characters, etc. The example values in Table 1 also include one or more associated user role(s) designated as "PL Auto Underwriter" associated with a personal-lines (individual) automotive underwriter and designated as "Holds Admin" associated with an administrator for policies on hold. Other example roles can include personal-line (individual) fire underwriter, personal-line (individual) homeowner's underwriter, personal-line (individual) renter's underwriter, personal-line (individual) life underwriter, etc. and/or business-line automotive underwriter, business-line fire underwriter, business-line liability underwriter, business-line renter's underwriter, business-line life underwriter, etc. In some examples, user roles can include corresponding agent roles, administrator roles, manager roles, etc.

Line 404 represents an example workflow subroutine of values being passed to filter builder 224 such as via flow 206. Filter builder 224 can receive a variety of variables and values including data represented by block 406, which for example can include string types Alias, SourceSystemPcEnvironment, PreferredRole, PreferredProduct, etc. Example values for these types can include Alias string: 0000, SourceSystemPcEnvironment string: PL-Auto #Dev, PreferredRole string: PL Auto Underwriter, PreferredProduct string: Personal Auto, etc.

Data 406 can represent data from a role preference table database 408, which can correspond to role preference table database 284. Dashed line 410, which can correspond to data 285 provided to filter builder 224 (and/or received from filter builder 224), more specifically illustrates that data from role preference table database 408 can be passed to block 412, which can represent a processor to get a user's preferred role for the AIR system. In at least one example, GetPreferredRole processor 412 can perform a series of operations on the values from 404 and the data 410. The series of operations can include identifying whether more than one role was passed in via 404; when more than one role was passed in via 404, determining whether data 410 includes a preferred role associated with the user; when the data 410 does not include a preferred role, cause display of a message that user has not yet set preferred role (and in various instance obtain a preferred role or apply a default preferred role); and when the preferred role data 410 is not one passed in passed in via 404, the GetPreferredRole processor 412 can cause the stored preferred role to be deleted from role preference table database 408. Line 414 represents an example workflow subroutine from GetPreferredRole processor 412.

Filter builder 224 can receive a variety of variables and values including data represented by block 416, which for example can include string types FilterCompare, KeepTogether, Role, etc. Data 416 can also include a list type variable Products, having a sub-type string. Example values for these types can include FilterCompare string: OR, KeepTogether string: All, Role string: PL Auto Underwriter, Products List [1]: Ø string: Personal Auto, etc. Data 416 can represent data from a role-to-product map table database 418, which can correspond to role-to-product map table database 280. Dashed line 420, which can correspond to data 281 provided to filter builder 224 more specifically illustrates that data from role-to-product map table database 418 can be passed to block 422, which can represent a processor to identify a user's allowed product(s) for the AIR system. In at least one example, AllowedProduct processor 422 can perform a series of operations on the data 414 from GetPreferredRole processor 412 and the data 420. The series of operations can include performing a query of data 420 from role-to-product map table database 418 using the preferred role from 414; identifying when the data 420 does not include a product having an associated role matching the preferred role, cause display of a message that no products match the user's preferred role. Line 424 represents an example workflow subroutine from AllowedProduct processor 422.

Filter builder 224 can receive a variety of variables and values including data represented by block 426, which for example can include multiple variables and/or filters mapping multiple indexes. Examples of variables can include RoleProduct, FilterTypeAliasPcEnvironment, Filter Type, Alias, Filters, PcEnvironment, etc. In the illustrated example, data 426 can include a map type variable Filters, containing list type variables having sub-type string. The list-type variables can include ActivitySubject List [10], UnderwriterIssueNames List [9], Vehicle Uses List [1], etc. Example mapping and values for data 426 are presented in Table 2.

TABLE 2

| Filter | Map {3} | | | |
|---|---|---|---|---|
| | ActivitySubject | List [10] | | |
| | | 0 | String | Review courier use |
| | | 1 | String | Review MVR |
| | | 2 | String | Review TNC use |
| | | 3 | String | Review and approve |
| | | 4 | String | Review document ST RPT compliance |
| | | 5 | String | Blocked pending transaction action required |
| | | 6 | String | Review document filings |
| | | 7 | String | License suspension review |
| | | 8 | String | Major driving violation review |
| | | 9 | String | Company or eligibility change |
| | UnderwriterIssueNames | List [9] | | |
| | | 0 | String | Coverage extension for named insured |
| | | 1 | String | Coverage Limit Review - Combined |
| | | 2 | String | Coverage Limit Review - Split |
| | | 3 | String | Review Nonrenewing policy |
| | | 4 | String | Policy is set to non-renew or has non-renewed |
| | | 5 | String | Review change to driver exclusion |
| | | 6 | String | Waiver of subrogation against USA |
| | | 7 | String | Waiver of subrogation under the liability coverage |
| | | 8 | String | Waiver of subrogation |
| | VehicleUses | List [1] | | |
| | | 0 | String | To work, school, or pleasure |

Data 426 can represent data from an activity-filter table database 428, which can correspond to activity-filter table database 290. Dashed line 430, which can correspond to data 292 provided to filter builder 224 more specifically illustrates that data from activity-filter table database 428 can be passed to block 432, which can represent a processor to get filters for product(s) for the AIR system. In at least one example, GetFiltersForProducts processor 432 can perform a series of operations on the data 424 from AllowedProduct processor 422 and the data 430. The series of operations can include identifying the filter types from the data 424 from AllowedProduct processor 422. In at least one example, filter builder 224 can include a minimum of two filters, and optionally two additional filters. Two of the filters can include a primary (master) filter and a sort filter. In the primary (master) filters, each role and product combination can have a set of attributes for use in finding activities. The Master filters can be maintained by System Coordinators. In the sort filters, each product has a set of attributes, and the products are sorted according to these attributes, which forces a top activity to the top of the index when a user requests their next work item. Two optional filters include a user filter and a personal filter. The user filters exist for users that need to work a set of activities that differ from those produced by the primary (master) filter. The user filters can be maintained by system coordinators and managers. The personal filters exist for a user that creates their own personal filter. A personal filter will add to or modify the criteria established by the primary (master) filter and an alias filter. Via a personal filter, users can be given access to modify certain sets of criteria based on the product. Personal filters can be maintained by users themselves.

Line 434 can represent an example workflow subroutine from GetFiltersForProducts processor 432 to mashing processor 436. In at least one example, mashing processor 436 can mash, e.g., integrate together, a plurality of filters for searching as shown by line 438. Block 440 can represent a personal (individual) auto primary (master) filter having two subfilters, an ActivitySubject=[A,B,C] and a VehicleUses=[1,2,3]. Block 442 can represent a personal (individual) auto user filter having one subfilter, an ActivitySubject=[A,B]. Block 444, can represent a personal (individual) auto personal filter having three subfilters, a Priority=High, a Jurisdiction=[OH] and a VehicleUses=[1]. Lines 446, 448, and 450, respectively represent workflow passing from the filters of blocks 440, 442, and 444 to block 452. In this example, block 452 can represent a personal (individual) auto mashed filter, which can produce ActivitySubject=[A,B], VehicleUses=[1], Priority=High, a Jurisdiction=[OH].

Figure 5:
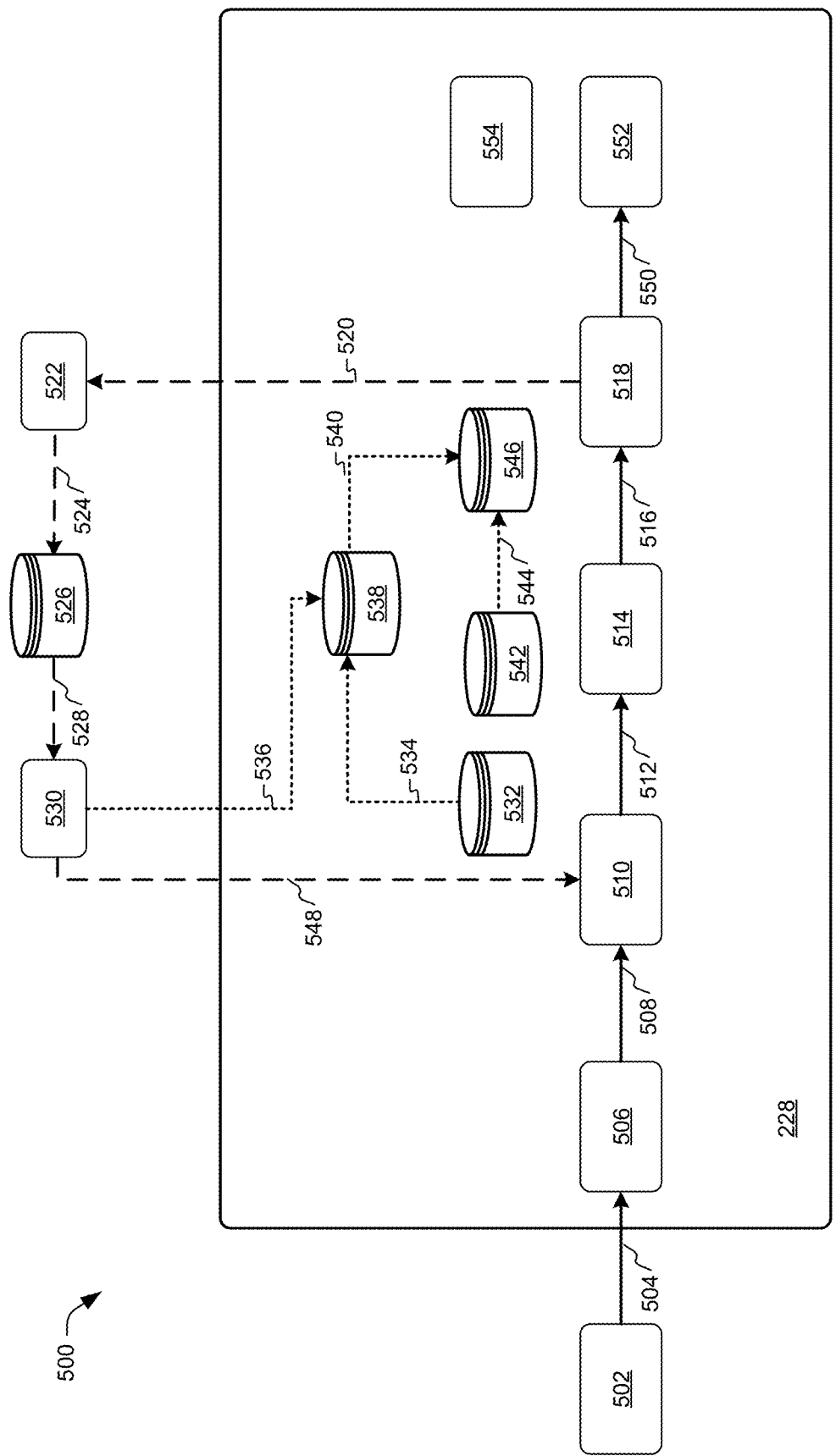
FIG. 5 is a block diagram depicting an example framework that can be associated with part of the framework from FIG. 2 according to various examples described herein.

FIG. 5 is a block diagram depicting an example framework 500 that can be associated with the filter processor module 228 part of the framework from FIG. 2 according to various examples described herein.

Block 502 illustrates example values received by filter builder 228, 122, from filter builder 224, 120. In at least one example, values can include data to populate seven variables. The seven variables can include a source system, an environment, an alias, a mashed filter, a sort filter, a filter compare type, and a keep together type, although many other variables are possible. In at least one example, the variables and their associated values can take the form represented in Table 3.

TABLE 3

| Variable | Value |
|---|---|
| sourceSystem | PL-Auto |
| pcEnvironment | DEV |
| alias | 0000 |

TABLE 3-continued

| Variable | Value |
| --- | --- |
| mashedFilter | Personal Auto, Activity Subject = [A, B], VechicleUses = [1], Priority = [High], Jurisdiction = [OH] |
| sortFilter | Personal Auto, DueDate, Priority |
| filterCompare | OR |
| keepTogether | All |

The example values in Table 3 include a source system associated with personal-line (individual) automotive insurance, though other examples could represent personal-line (individual) fire insurance, personal-line (individual) homeowner's insurance, personal-line (individual) renter's insurance, personal-line (individual) life insurance, etc. and/or business-line automotive insurance, business-line fire insurance, business-line liability insurance, business-line renter's insurance, business-line life insurance, etc.

The example values in Table 3 also include an environment associated with a developer, though other examples could represent an environment associated with one or more of, development (shown), acceptance, clock, console, data, infra, local workstation, mock, operations, performance, test, system, work in progress, etc. The example values in Table 3 also include an alias associated with a login credential, e.g., a user identifier, which is shown as a numeric value "0000," although other examples could include alpha numeric characters, etc. The example values in Table 3 also include a mashed filter, associated with ActivitySubject=[A, B], VehicleUses=[1], Priority=High, a Jurisdiction=[OH]. The particular example values in Table 3 also include a sort filter, associated with personal (individual) auto, due date, and priority. The particular example values in Table 3 also include a compare filter set to "OR" and a keep together filter set to "All," though the other examples could be received from filter builder 224 in other scenarios.

Line 504 represents an example workflow subroutine of values being passed to filter builder 228 such as via flow 226. Block 506 can represent a processor module to build a query for the AIR system. In at least one example, BuildQuery processor module 506 can use mashed filters, filter compare type, user ID, and sortFilter to build the query. For example, BuildQuery processor module 506 can perform a series of operations on the values from 404 and the data from 410. The series of operations can include using FilterCompare to determine if each attribute's criteria must be found (in the case it is set to "AND") or if just one attribute's criteria must be found (in the case it is set to "OR"). The series of operations can also include using the User ID to prevent the user from getting the same activity they had just previously had. The series of operations can also include using the sort filter to determine which activity should be worked next from the group of activities returned. Line 508 represents an example workflow subroutine from BuildQuery processor module 506.

Block 510 can represent a processor module to execute the query as built using a mashed filter. For example, ExecuteQuery processor module 510 can execute the query against the activity index database 526, 218 to return the subset of activities that is presorted and matches the criteria from the mashed filter. Line 512 represents an example workflow subroutine from ExecuteQuery processor module 510.

Block 514 can represent a processor module to process keep-together logic. For example, the processor module 514 can use the keep together type to determine if a next iteration is going to be limited to look at the first set returned or look back to the activity index database 526. In at least one example, the processor module 514 can use keys based on an agreement ID or a job number to keep like activities together. In at least one example, the processor module 514 can use an additional AND/OR filter to determine if at least one or all underwriter issues must be found in the collection of activities to be returned to the user. Line 516 represents an example workflow subroutine from the processor module 514.

Block 518 can represent a processor module to remove activities from activity index database 526. For example, the RemoveActivities processor module 518 can remove the activities to be returned to the user from activity index database 526 so that the index only contains unassigned work and assigning duplicate activities can be avoided.

Dashed line 520 represents data to delete activity being passed from the RemoveActivities processor module 518 to a delete activity module 522, which can correspond to delete activity module 216. Dashed line 524 illustrates an example of data identified for deletion being sent to an example activity index database 526, e.g., containing 9000 activities. Dashed line 528 illustrates example data being provided from activity index database 526 to select activity module 530, which can correspond to delete activity module 234. In at least one example, this can represent a system process triggered in the workflows and/or by a request such as from source application 202 to get the next activity to work.

Database 532 includes the subset of activities from the query using the mash filter 510, e.g., 1000 activities. Dotted line 534 can represent data from database 532 to which keep-together-filtered logic is applied. Dotted line 536 can represent data from select activity module 530 to which keep-together-all logic is applied. Database 538 receives and stores the data 534 and 536. Dotted line 540 can represent data from database 536, e.g., the subset of activities [R,Z]. Database 542 represents another subset of activities identified according to the keep-together logic applied. Dotted line 544 can represent data from database 542, e.g., the subset of activities [A]. Database 546 receives and stores the data 540 and 544.

Dashed line 548 illustrates example data being provided from select activity module 530 to ExecuteQuery processor module 510 for further processing. When no further activities are identified using keep-together logic processor module 514 or RemoveActivities processor module 518, workflow as illustrated by line 550 passes to a return module as shown at block 552. Return module 552 can return keys to the collection of activities ready to be worked on by the user. For example, the keys can be 0 to many and can include one or more of Activity Public ID, Activity ID, Job Number, Agreement Index ID, Cluster Name, PC Environment, etc.

Illustrative Processes

The order in which the operations are described in each example flow diagram and/or process is not intended to be construed as a limitation, and any number of the described operations can be combined in any order and/or in parallel to implement each process. Moreover, the operations in each of FIGS. 6, 7, and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

Figure 6:
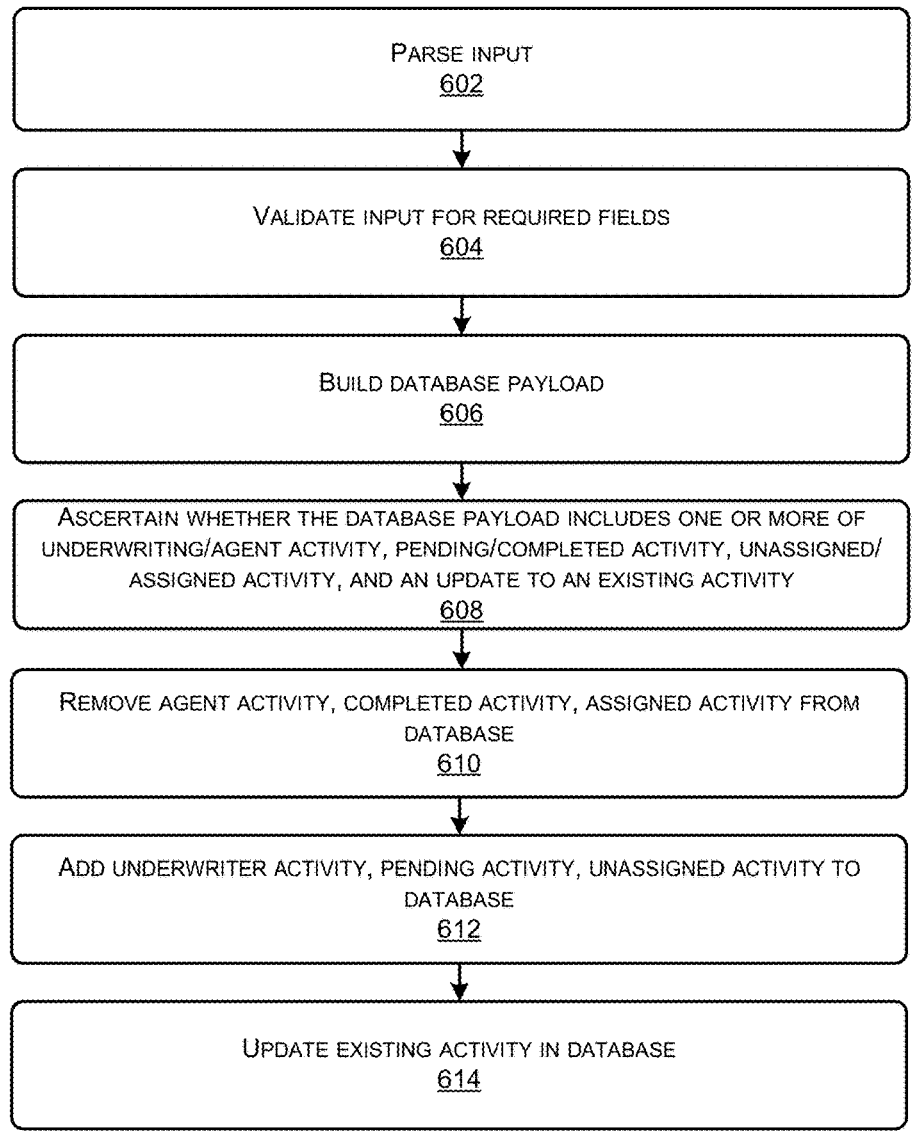
FIG. 6 is a block diagram depicting part of the example framework from FIG. 2 and a flowchart of example operations associated with that part of the framework as described herein.

FIG. 6 is a flow diagram that illustrates an example process associated with the top part of the framework of FIG. 2 as described herein.

In at least one example, the example activity processor illustrated at block 212 can perform a series of seven operations, e.g., on input from application(s) 202. Blocks 602-614 illustrate the example series of operations. At block 602, the example activity processor 212 can parse a plurality of inputs received via workflow 204. At block 604, the example activity processor 212 can validate the plurality of inputs for required fields. At block 606, the example activity processor 212 can build a database payload to store data associated with the input as an index to activities in a database 218.

At block 608, the example activity processor 212 can ascertain whether the database payload includes an underwriting activity or an agent activity, ascertain whether the database payload includes a pending activity or a completed activity, and ascertain whether the database payload includes an unassigned or an assigned activity. Depending on what the payload includes, workflow 214 can pass to delete activity module 216 or workflow 220 can pass to add activity module 222.

At block 610, the example delete-activity module 216 can provide the database payload as data 217 including instructions to remove an agent activity, a completed activity, and/or an assigned activity from the database 218.

At block 612, the example add-activity module 222 can provide the database payload as data 223 including instructions to add an underwriting activity, a pending activity, and/or an unassigned activity for storage in the index to activities to the database 218.

At block 614, in some examples, the delete-activity module 216 and the add-activity module 222 can work together to provide the database payload as data 217 and data 223 including instructions to update an existing activity in the database. In at least one example, the add-activity module 222 can determine whether there is a match to an activity key. When the add-activity module 222 identifies a match can update the existing activity, and when the add-activity module 222 does not identify a match can add an activity corresponding to the activity key. In examples, a set of activity indexes to be performed is generated from the index of activities in the database 218.

In at least one example, types in an activity record can include source_system, activity_public_id, pc_environment, activity_id, job_number, source_pc_clustername, and activity_payload. The example activity can include, source_system: PL-Auto, activity_public_id: pc:501, pc_environment: unsharded, activity_id: 501, job_number: 485858235, source_pc_clustername: PLA-01, activity_payload: {"DueDate": "2020-08-03", "ShardId": "unsharded", "FormName": " ", "Priority": "High", "JobNumber": " ", "ActivityID": "501", "PolicyType": " ", "ProductName": "Personal Auto", "VehicleUses": [ ], "Jurisdiction": [ ], "SourceSystem": "PL-Auto", "PCEnvironment": "WPWFCMT1", "EscalationDate": "2020-08-10", "ActivitySubject": "Manual Underwriting Review", "TransactionType": " ", "ActivityPublicID": "pc:501", "AgreementIndexId": "452585389", "ActivityStartTime": "16:00:26.843930100", "EscalationIndicator": "No", "PreviousAssignedUser": "su", "ProducerCodeOfService": "16-35-3037", "UnderwriterIssueNames": [ ]}

Figure 7:
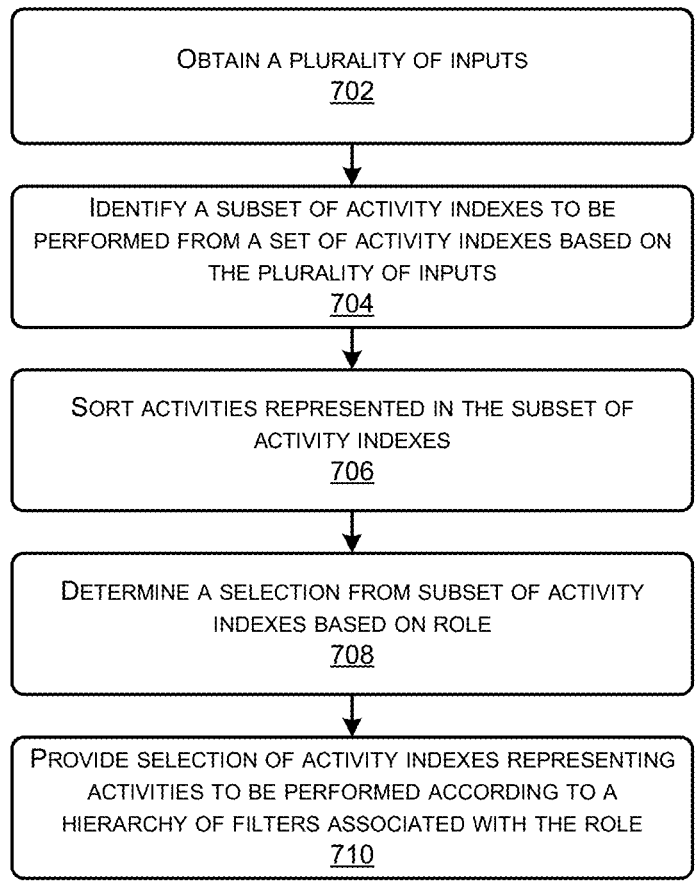
FIG. 7 is a flow diagram that illustrates an example process associated with an activity index resolver (AIR) system and workflow method according to various examples described herein.

FIG. 7 is a flow diagram that illustrates an example process 700 associated with an activity index resolver (AIR) system and workflow method according to various examples described herein.

At block 702, components of an AIR system can obtain a plurality of inputs. For example, an activity processor 212 can receive instructions to add, delete, and/or update activities in an activity database 218; a filter builder can receive input requesting work; and/or an AIR front-end application 236 can receive instructions to apply filters.

At block 704, components of the AIR system can identify a subset of activity indexes to be performed, from a set of activity indexes, based on the plurality of inputs. In various examples, the AIR system can identify the subset according to the description(s) of one or more of AIR system framework 200 including the activity processor, AIR front-end application framework 300, filter builder framework 400, and/or filter processor framework 500.

At block 706, components of the AIR system can sort activities represented in the subset of activity indexes, e.g., by applying filters as described regarding filter processor framework 500.

At block 708, components of the AIR system can determine a selection from the subset of activity indexes according to authorization conferred with a role associated with a provider of the plurality of inputs, e.g., by generating filters as described regarding filter builder framework 400. In various examples, the selection can represent one or more activities (e.g., one activity or a plurality of related activities) associated with the respective subset of activity indexes.

At block 710, components of the AIR system can provide the selection of the activity indexes indicating respective activity/activities to be performed according to a hierarchy of filters associated with the role associated with a provider of the plurality of inputs, e.g., according to the description of AIR system framework 200 and applying filters as described regarding filter processor framework 500.

Figure 8:
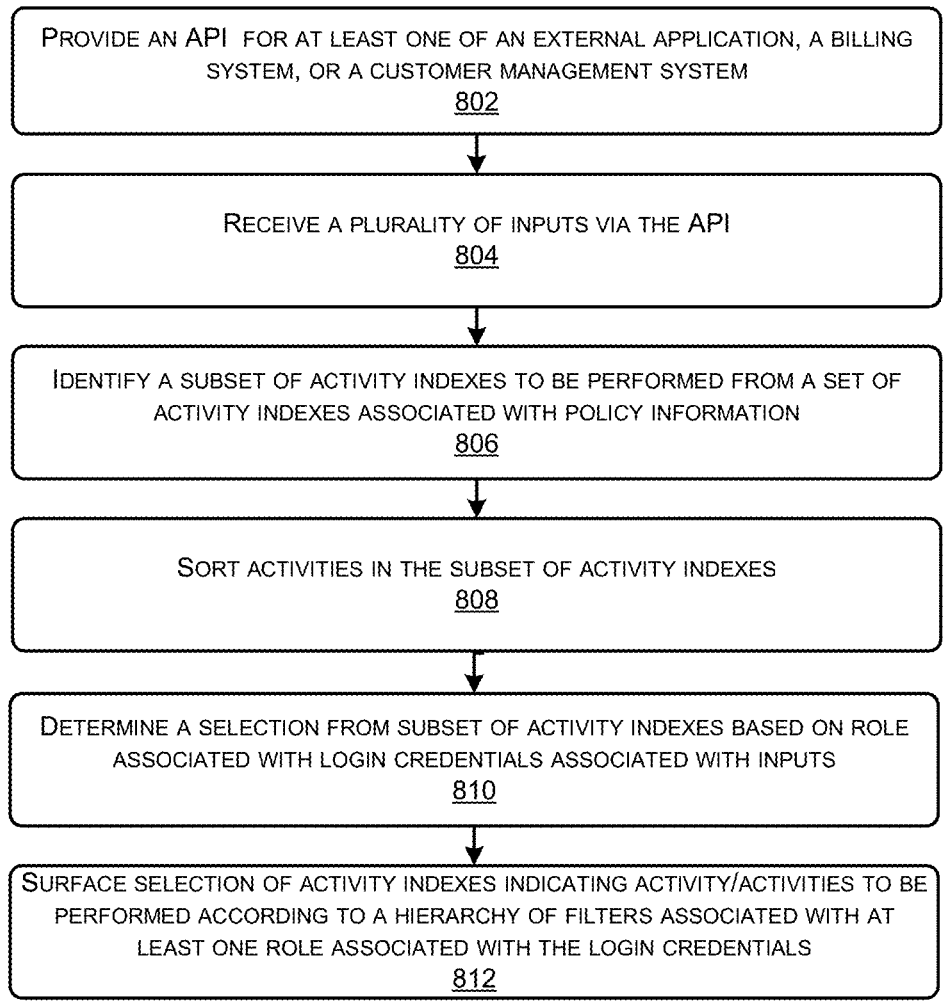
FIG. 8 is a flow diagram that illustrates an example process associated with an activity index resolver (AIR) system and workflow method according to various examples described herein.

FIG. 8 is a flow diagram that illustrates an example process 800 associated with an activity index resolver (AIR) system and workflow method according to various examples described herein.

At block 802, components of the AIR system can provide an API for at least one of an external application, a billing system, or a customer management system having associated login credentials, e.g., via activity processor 212, filter builder 224, and/or AIR front-end application 236.

At block 804, components of the AIR system can receive a plurality of inputs via the API, e.g., via workflows 204, 206, and/or 208.

At block 806, components of the AIR system can identify a subset of activity indexes to be performed from a set of activity indexes associated with insurance policy information. In various examples, the AIR system can identify the subset of activity indexes according to the description(s) of one or more of AIR system framework 200 including the activity processor, AIR front-end application framework 300, filter builder framework 400, and/or filter processor framework 500.

At block 808, components of the AIR system can sort activities in the subset of activity indexes, e.g., by applying filters as described regarding filter processor framework 500.

At block 810, components of the AIR system can determine a selection from the subset of activity indexes according to authorization conferred with a role associated with the login credentials associated with the plurality of inputs, e.g., by generating filters as described regarding filter builder framework 400. In various examples, the selection can represent one or more activities (e.g., one or a plurality of related activities) associated with the respective subset of activity indexes.

At block 812, components of the AIR system can surface the selection of the activity indexes indicating respective activity/activities to be performed according to a hierarchy of filters associated with at least one role associated with the login credentials, e.g., according to the description of AIR system framework 200 and applying filters as described regarding filter processor framework 500.

Illustrative Graphical User Interface

FIG. 9 is a block diagram that illustrates an example graphical user interface (GUI) 900 associated with an activity index resolver (AIR) system and workflow method according to various examples described herein. GUI 900 can be presented by computing device 104.

The GUI 900 includes an area configured to receive an indication of a preferred role 902, which in the illustrated example includes PL Auto Underwriter, though many other options are possible and to be expected. In the illustrated example, indication of the preferred role can be from a drop-down menu. Alternatively, in some examples, indication of the preferred role can include indication via radio buttons, predictive text entry, etc.

The GUI 900 includes an area configured to receive an indication of a preferred product 904, which in the illustrated example includes Private Passenger Auto, though many other options are possible and to be expected. In the illustrated example, indication of the preferred product can be from a drop-down menu. Alternatively, in some examples, indication of the preferred product include indication via radio buttons, predictive text entry, etc.

The GUI 900 includes an area configured to receive an indication of a transaction type 906, and area configured to show available transaction types 908, an interface area associated with transaction types 910, and an area configured to show the transaction type(s) chosen 912. In the illustrated example, indication of the transaction type can be from available transaction types 908 via buttons in the interface area 910. The buttons in area 910 can enable input indicating one or all of the transaction types as well as removing the chosen status from one or all of the transaction type(s) previously chosen.

The GUI 900 includes an area configured to receive an indication of a priority type 914, and area configured to show available priority types 916, an interface area associated with priority types 918, and an area configured to show the priority type(s) chosen 920. In the illustrated example, the priority type can be chosen from available priority types 916 via buttons in the interface area 918. The buttons in area 918 can enable indication of one or all of the priority types as well as removing the chosen status from one or all of the priority type(s) previously chosen.

The GUI 900 includes an area configured to receive an indication of a state type 922, and area configured to show available state types 924, an interface area associated with state types 926, and an area configured to show the state type(s) chosen 928. In the illustrated example, the state type can be chosen from available state types 924 via buttons in the interface area 926. The buttons in area 926 can enable indication of one or all of the state types as well as removing the chosen status from one or all of the state type(s) previously chosen.

The GUI 900 includes an area configured to receive an indication of an underwriter issue type 930, and area configured to show available underwriter issue types 932, an interface area associated with underwriter issue types 934, and an area configured to show the underwriter issue type(s) chosen 936. In the illustrated example, the underwriter issue type can be chosen from available underwriter issue types 932 via buttons in the interface area 934. The buttons in area 934 can enable indication of one or all of the underwriter issue types as well as removing the chosen status from one or all of the underwriter issue type(s) previously chosen.

The GUI 900 includes an area configured to receive an indication of a vehicle use type 938, and area configured to show available vehicle use types 940, an interface area associated with vehicle use types 942, and an area configured to show the vehicle use type(s) chosen 944. In the illustrated example, the vehicle use type can be chosen from available vehicle use types 940 via buttons in the interface area 942. The buttons in area 942 can enable indication of one or all of the vehicle use types as well as removing the chosen status from one or all of the vehicle use type(s) previously chosen.

The GUI 900 as illustrated also includes a save button 946 and a clear all button 948 at the bottom of the GUI, though one or both of the button can be represented in other locations in some examples.

Illustrative Components

Figure 10:
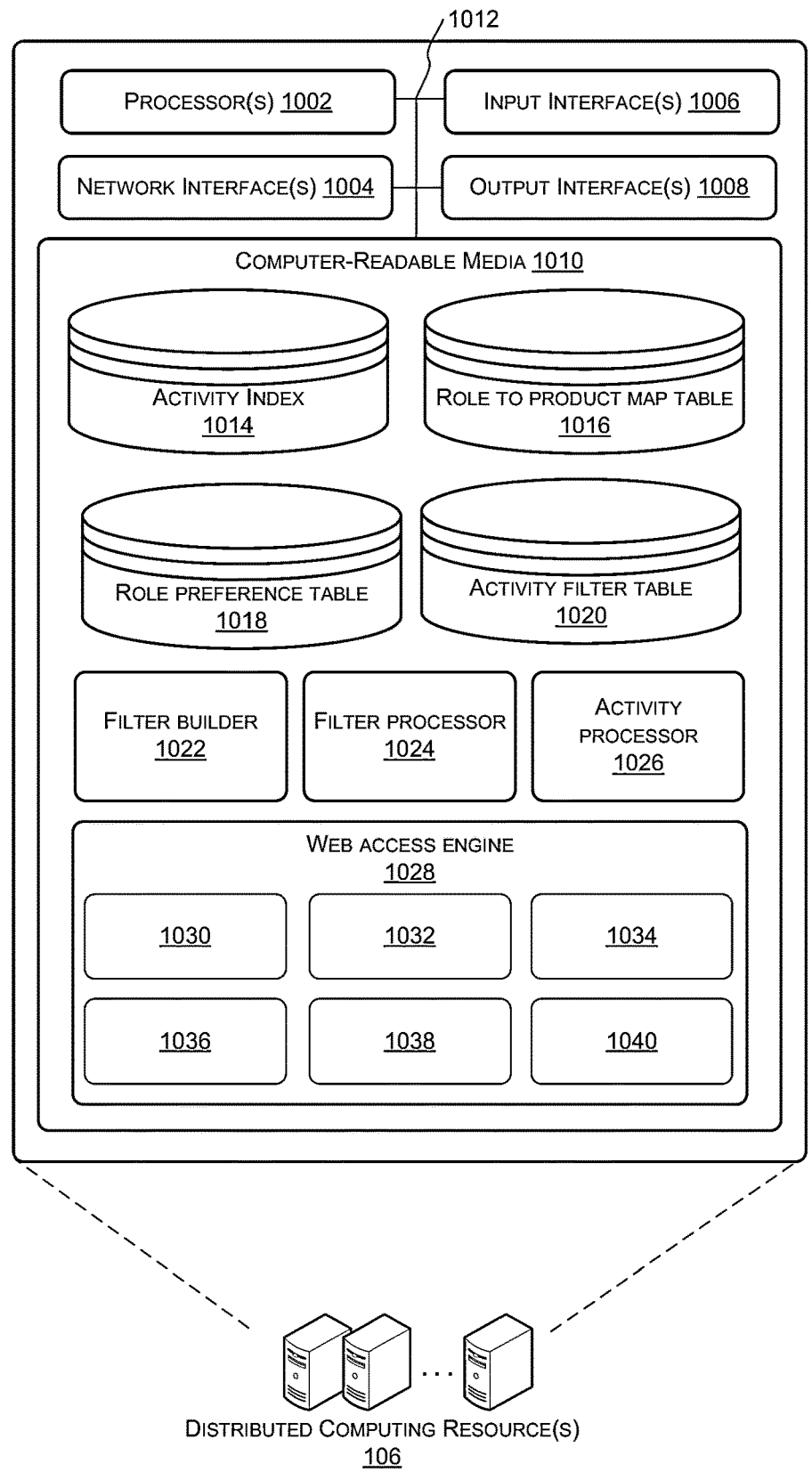
FIG. 10 is a block diagram depicting an example computing device configured to participate in an activity index resolver (AIR) system and workflow method according to various examples described herein.

FIG. 10 is a block diagram depicting an example computing device configured to participate in an activity index resolver (AIR) system and workflow method according to various examples described herein.

FIG. 10 is an illustrative diagram that shows an example configuration of components of a computing device 1000, which can represent a computing device(s) 102, and which can be and/or implement an activity index resolver (AIR) system, device, and/or apparatus, according to various examples described herein. Example computing device 1000 includes one or more processing unit(s) 1002, network interface(s) 1004, input interface(s) 1006, output interface(s) 1008, and computer-readable media 1010. The components of computing device 1000 are operatively connected, for example, via a bus 1012. These components can represent corresponding components from device(s) 102 a, e.g., processing unit(s) 1002 can represent processing unit(s) 112, bus 1012 can represent bus 116, etc.

In example computing device 1000, processing unit(s) 1002 can correspond to processing unit(s) 112, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 502 can include an on-board memory, e.g., a RAM and/or cache, not shown.

Network interface(s) 1004, which can represent communications interface(s) 128, can represent, for example, network interface controllers (NICs) or other types of transceiver devices to send and receive communications over a network.

Input/output (I/O) interfaces 1006 and 1008 allow computing device 1000 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Computer-readable media 1010 can correspond to computer-readable media 124 and can store instructions executable by the processing unit(s) 1002. Computer-readable media 1010 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in computing device 200, while in some examples one or more of a CPU, GPU, and/or accelerator is external to computing device 1000.

In the illustrated example, computer-readable media 1010 includes four datastores: activity index datastore 1014, role-to-product-map table datastore 1016, role preference table datastore 1018, activity filter table datastore 1020, any one or more of which can also be represented by datastore 126, FIG. 1. In various examples, activity index datastore 1014, role-to-product-map table datastore 1016, role preference table datastore 1018, and/or activity filter table datastore 1020 can include data storage such as a database, data warehouse, or other type of structured or unstructured data storage (e.g., a Structured Query Language, SQL, an RDS PostgreSQL database, and/or NoSQL database), a Dynamo database, an S3 storage, etc. In some examples, activity index datastore 1014, role-to-product-map table datastore 1016, role preference table datastore 1018, and/or activity filter table datastore 1020 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. activity index datastore 1014, role-to-product-map table datastore 1016, role preference table datastore 1018, and/or activity filter table datastore 1020 can store data for the operations of processes, applications, components, and/or modules stored in computer-readable media 1010 and/or executed by processing unit(s) 1002 and/or accelerator(s).

In at least one example, computing device 1000 can implement one or more of filter builder 1022, filter processor 1024, activity processor 1026 and/or other processors described herein as Lambda processors. Computing device 1000 can implement a filter builder 1022 to operate dynamically. Filter builder 1022 can represent filter builder 120, 224, and can operate according to the description 200, 400. Computing device 1000 can also implement a filter processor 1024, which generally operates with filter(s) from filter builder 1022. Filter processor 1024 can represent filter processor 122, 228, and can operate according to the description 200, 500.

Computing device 1000 can also implement an activity processor 1026 to control activity index database 1014, 218. Activity processor 1026 can represent activity processor 124, 212, and can operate according to the description 200, 600.

In at least one example, computing device 1000 can implement a web access engine 1028 as an Angular web page. Web access engine 1028 can represent AIR front-end application 144, 236, 302 and can operate to provide access to an AIR system according to the description of GUI 900. Web access engine 1028 can include one or more modules to provide associated interfaces. In examples, block 1030 represents a personal filter module, which can correspond to block 304 that illustrates an example interface to receive a personal filter indication. In examples, block 1032 represents an edit-role product map module, which can correspond to block 306 that illustrates an example interface to edit a role-product map. In examples, block 1034 represents an activities overview module, which can correspond to block 308 that illustrates an example interface to receive an overview of activities.

In examples, block 1036 represents an edit-primary (master)/sort filter module, which can correspond to block 310 that illustrates an example interface to edit a primary (master)/sort filter. In examples, block 1038 represents an edit-alias filter module, which can correspond to block 312 that illustrates an example interface to edit an alias filter. In examples, block 1040 represents a support tools module, which can correspond to block 314 that illustrates an example interface to access support tools.

EXAMPLE CLAUSES

Clause 1. A system comprising:
one or more processing units; and
one or more computer-readable media storing computer-executable instructions that, when executed by the one or more processing units, cause the one or more processing units to perform operations including:
managing access to a plurality of databases associated with insurance policies;
presenting an API interface configured to connect at least one application and enable storing, as a set of activity indexes, indexes to activities associated with the at least one application in a first database of the plurality of databases;
receiving a plurality of inputs, wherein the plurality of inputs includes a value to populate a variable representing at least one role associated with login credentials and at least one of: a source system, an environment, an alias, a product, a transaction, a priority, a state, an issue, or a vehicle use;
identifying a subset of activity indexes to be performed based on the plurality of inputs;
sorting activities in the subset of activity indexes according to the hierarchy of filters;
determining a selection from the subset of activity indexes according to authorization conferred with a role associated with a provider of the plurality of inputs; and
providing the selection of the subset of activity indexes to be performed according to the hierarchy of filters associated with the role associated with the provider of the plurality of inputs.

Clause 2. A system as Clause 1 recites, wherein the activities include at least one of: obtaining a picture of the vehicle; determining that the registration of the vehicle is up to date; obtaining a risk rating associated with the vehicle owner or driver; obtaining a picture of the business; obtaining a picture of the home; obtaining a picture of the building housing the business or the home; obtaining a fire-safety inspection of the business, the home, or the building housing the business or the home; determining that taxes are not delinquent for the business, the home, or the building housing the business or the home; determining that a mortgage is not delinquent for the business, the home, or the building housing the business or the home; obtaining a risk rating associated with the business owner, the home owner, the building owner, the renter; obtaining a picture of the applicant for life insurance; obtaining a medical history associated with the applicant for life insurance; obtaining current medical information associated with the applicant for life insurance; or obtaining a risk rating associated with the applicant for life insurance.

Clause 3. A system as Clause 1 or 2 recites, wherein the role is included in a second database of the plurality of databases, wherein the second database associates roles with products.

Clause 4. A system as any of Clauses 1-3 recites, wherein the role is included in a third database of the plurality of databases, wherein the third database associates roles with preferences.

Clause 5. A system as any of Clauses 1-4 recites, wherein the filters are included in a fourth database of the plurality of databases, wherein the fourth database associates activities with filters from the hierarchy of filters.

Clause 6. A system as any of Clauses 1-5 recites, wherein the hierarchy of filters controls access to work on activities from the set of activity indexes based on a role assigned to a user.

Clause 7. A system as any of Clauses 1-6 recites, the one or more computer-readable media further storing computer-executable instructions that, when executed by the one or more processing units, cause the one or more processing units to perform operations further comprising:
  receiving a selection of an activity from the subset of activities to be performed; and
  removing the activity selected from the set of activity indexes.

Clause 8. A system as any of Clauses 1-7 recites, further comprising an activity processor module including computer-executable instructions that, when executed by the one or more processing units, cause the one or more processing units to perform operations further comprising:
  parsing the plurality of inputs;
  validating the plurality of inputs for required fields;
  building a database payload to store data associated with the input as an index to activities in the first database of the plurality of databases;
  ascertaining whether the database payload includes an underwriting activity or an agent activity;
  ascertaining whether the database payload includes a pending activity or a completed activity;
  ascertaining whether the database payload includes an unassigned activity or an assigned activity; and
  providing the database payload including the underwriting activity, the pending activity, and the unassigned activity or the assigned activity for storage in the index to activities to the first database of the plurality of databases, wherein the set of activity indexes to be performed is generated from the index of activities in the first database of the plurality of databases.

Clause 9. A system as any of Clauses 1-8 recites, further comprising a filter builder module including computer-executable instructions that, when executed by the one or more processing units cause the one or more processing units to perform operations further comprising:
  receiving at least a preferred role associated with login credentials;
  obtaining at least one product associated with the preferred role;
  obtaining at least one filter type associated with the at least one product; and
  integrating filters associated with the at least one product according to the hierarchy of filters to obtain data to search for activities to be performed associated with the at least one product from the first database.

Clause 10. A system as any of Clauses 1-9 recites, further comprising a filter processor module including computer-executable instructions that, when executed by the one or more processing units cause the one or more processing units to perform operations further comprising:
  executing a plurality of queries to identify activities to be performed associated with at least one product from the first database based on the hierarchy of filters; and
  generating the subset of activities to be performed for presentation.

Clause 11. A method of resolving workflow operations from a plurality of disparate tools comprising, the method comprising:
  providing an application programming interface (API) for at least one of an external application, a billing system, or a customer management system;
  obtaining a plurality of inputs via the API, wherein the plurality of inputs include at least one of:
    values to populate variables representing at least one role associated with login credentials and at least one of: a source system, an environment, or an alias, or
    insurance policy information obtained from a first database that houses policy data;
  identifying a subset of activity indexes to be performed from a set of activity indexes associated with the policy information;
  sorting activities represented in the subset of activity indexes;
  identifying at least one role associated with the login credentials; and
  determining a selection from the subset of activity indexes according to a hierarchy of filters associated with the at least one role associated with the login credentials.

Clause 12. A method as Clause 11 recites, wherein the plurality of inputs includes a request to add or change an insurance policy, the request including an indication of whether the request pertains to business insurance or individual insurance and whether the request pertains to automobile insurance, fire insurance, homeowner's insurance, renters insurance, or life insurance.

Clause 13. A method as Clause 11 or 12 recites, wherein the plurality of inputs includes attributes associated with an insurance product including one or more of individual insurance, business insurance, automobile insurance, homeowner's insurance, renters insurance, or life insurance.

Clause 14. A method as any of Clauses 11-13 recites, wherein the hierarchy of filters controls access to work on an insurance product associated with the plurality of inputs.

Clause 15. A method as Clause 14 recites, wherein the hierarchy of filters includes a primary filter, a user filter, and a personal filter.

Clause 16. A method as any of Clauses 11-15 recites, wherein the activities include at least one of: obtaining a picture of the vehicle; determining that the registration of the vehicle is up to date; obtaining a risk rating associated with the vehicle owner or driver; obtaining a picture of the business; obtaining a picture of the home; obtaining a picture of the building housing the business or the home; obtaining a fire-safety inspection of the business, the home, or the building housing the business or the home; determining that taxes are not delinquent for the business, the home, or the building housing the business or the home; determining that a mortgage is not delinquent for the business, the home, or the building housing the business or the home; obtaining a risk rating associated with the business owner, the home owner, the building owner, the renter; obtaining a picture of the applicant for life insurance; obtaining a medical history associated with the applicant for life insurance; obtain current medical information associated with the applicant for life insurance; or obtaining a risk rating associated with the applicant for life insurance.

Clause 17. A method as any of Clauses 11-16 recites, further comprising at least one of:
obtaining a product associated with the at least one role associated with the login credentials, the product obtained from a second database of the plurality of databases, wherein the second database associates roles with products;
obtaining a preference associated with the login credentials in use, the preference obtained from a third database of the plurality of databases, wherein the third database associates roles with preferences; or
obtaining a filter associated with the login credentials in use, the filter obtained from a fourth database of the plurality of databases, wherein the fourth database associates activities with filters from the hierarchy of filters.

Clause 18. A method as any of Clauses 11-17 recites, wherein the hierarchy of filters controls access to work on activities from the set of activity indexes based on a role assigned to a user.

Clause 19. A method as any of Clauses 11-18 recites, further comprising:
presenting the selection from the subset of activity indexes;
receiving an input indicating a choice of an activity from the selection; and
removing the activity selected from the set of activity indexes.

Clause 20. A graphical user interface implemented by a plurality of components comprising:
one or more processing units;
one or more computer-readable media storing computer-executable instructions that, when executed by the one or more processing units, cause the one or more processing units to present the graphical user interface on a screen associated with a computing device, the graphical user interface including:
a plurality or areas associated with received login credentials, the plurality of areas including at least one of:
a first area configured to receive a choice of a preferred role;
a second area configured to receive a choice of a preferred product;
a third area configured to receive a choice of a transaction type;
a fourth area configured to receive a choice of a priority level;
a fifth area configured to receive a choice of a state;
a sixth area configured to receive a choice of an underwriter issue; or
a seventh area configured to receive a choice of a type of vehicle use; and
an activation interface to cause the choice or choices associated with the plurality of areas to be submitted as input to an activity index resolver system for the computing device to receive a selection of activity indexes to be performed from a set of activity indexes available to be performed consistent with the input.

CONCLUSION

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/1002, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that can configure a processor to perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 500 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general-purpose computer(s) and/or processor(s) thereby reconfiguring the general-purpose computer(s) and/or processor(s) as special purpose computer(s) and/or processor(s) during their execution. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine.

Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise.

What is claimed is:

1. A system comprising:
   one or more processing units; and
   one or more computer-readable media storing computer-executable instructions that, when executed by the one or more processing units, cause the one or more processing units to perform operations including:
   receiving user login credentials via a network;
   presenting, based on the user login credentials, a first graphical user interface (GUI) comprising an application programming interface (API) configured to connect to an application and enable storing, as a set of activity indexes, indexes to activities associated with a role and the application in a database, wherein presenting the first GUI comprises providing a first instruction to a user computing device associated with the user login credentials to generate the first GUI;
   receiving, from the first GUI via the API, a plurality of inputs comprising the role associated with the user login credentials and at least one of a source system, an environment, an alias, a product, a transaction, a priority, a state, an issue, or a vehicle use;
   based on receiving the plurality of inputs, determining the set of activity indexes associated with the activities associated with the role by:
      generating a query comprising the role and one or more of the source system, the environment, the alias, the product, the transaction, the priority, the state, the issue, or the vehicle use;
      executing the query against the database to return a first subset of activity indexes;
      determining a second subset of activity indexes from among the first subset of activity indexes that is unassigned to a user;
   providing, based on determining the second subset of activity indexes, a second instruction to the user computing device to generate a second GUI presenting the second subset of activity indexes;
   receiving, from the second GUI, a personal filter input indicating a filter associated with the user login credentials;
   based on the personal filter input and the user login credentials, retrieving the filter and filtering the second subset of activity indexes using the filter to determine a third subset of activity indexes; and
   providing, based on determining the third subset of activity indexes, a third instruction to the user computing device to generate a third GUI presenting the third subset of activity indexes.

2. A system as claim 1 recites, wherein the activities include at least one of: obtaining a picture of a vehicle; determining that a registration of the vehicle is up to date; obtaining a risk rating associated with a vehicle owner or driver; obtaining a picture of a business; obtaining a picture of a home; obtaining a picture of a building housing the business or the home; obtaining a fire-safety inspection of the business, the home, or the building housing the business or the home; determining that taxes are not delinquent for the business, the home, or the building housing the business or the home; determining that mortgage payments are not delinquent for the business, the home, or the building housing the business or the home; obtaining a risk rating associated with a business owner, a home owner, a building owner, or a renter; obtaining a picture of an applicant for life insurance; obtaining a medical history associated with the applicant for life insurance; obtaining current medical information associated with the applicant for life insurance; or obtaining a risk rating associated with the applicant for life insurance.

3. A system as claim 1 recites, wherein the role is included in a second database that associates roles with products.

4. A system as claim 1 recites, wherein the role is included in a second database that associates roles with preferences.

5. A system as claim 1 recites, wherein retrieving the filter comprises retrieving the filter from a second database that associates login credentials with filters.

6. A system as claim 1 recites, wherein the filter controls access to work on activities from the second subset of activity indexes based on the role.

7. A system as claim 1 recites, the one or more computer-readable media further storing computer-executable instructions that, when executed by the one or more processing units, cause the one or more processing units to perform operations further comprising:
   receiving, via the third GUI, a selection of an activity index of the third subset of activity indexes; and
   removing the activity index from the set of activity indexes.

8. A system as claim 1 recites, further comprising an activity processor module including computer-executable instructions that, when executed by the one or more processing units, cause the one or more processing units to perform operations further comprising:
   parsing the plurality of inputs;
   validating the plurality of inputs for required fields;
   building a database payload to store data associated with the plurality of inputs as an index to activities in the database;
   ascertaining whether the database payload includes an underwriting activity or an agent activity;
   ascertaining whether the database payload includes a pending activity or a completed activity;
   ascertaining whether the database payload includes an unassigned activity or an assigned activity; and
   providing the database payload including the underwriting activity, the pending activity, and the unassigned activity or the assigned activity for storage in the index to activities to the database, wherein the set of activity indexes to be performed is generated from the index of activities in the database.

9. A system as claim 1 recites, further comprising a filter builder module including computer-executable instructions that, when executed by the one or more processing units cause the one or more processing units to perform operations further comprising:

receiving at least a preferred role associated with the user login credentials;

obtaining at least one product associated with the preferred role;

obtaining at least one filter type associated with the at least one product; and integrating filters associated with the at least one product into a second filter to obtain data to search for second activities to be performed associated with the at least one product from the database.

10. A system as claim 1 recites, further comprising a filter processor module including computer-executable instructions that, when executed by the one or more processing units cause the one or more processing units to perform operations further comprising:

executing a plurality of queries to identify second activities to be performed associated with at least one product from the database; and determining the set of activity indexes further based on the second activities to be performed associated with the at least one product.

11. A method of resolving workflow operations from a plurality of disparate tools comprising, the method comprising:

receiving user login credentials via a network;

presenting, based on the user login credentials, a first graphical user interface (GUI) comprising an application programming interface (API) for at least one of an external application, a billing system, or a customer management system, wherein presenting the first GUI comprises providing a first instruction to a user computing device associated with the user login credentials to generate the first GUI;

receiving, from the first GUI via the API, a plurality of inputs comprising:

values to populate variables representing a role associated with the user login credentials and at least one of a source system, an environment, or an alias, and insurance policy information obtained from a first database that houses policy data;

based on receiving the plurality of inputs, determining a first subset of activity indexes to be performed from a set of activity indexes associated with the insurance policy information and the role by:

identifying the role based on the user login credentials;

generating a query comprising the role and one or more of the source system, the environment, or the alias;

executing the query against the database to return a second subset of activity indexes;

determining a second subset of activity indexes from among the first subset of activity indexes that is unassigned to a user;

providing, based on determining the second subset of activity indexes, a second instruction to the user computing device to generate a second GUI presenting the second subset of activity indexes;

receiving, from the second GUI, a personal filter input indicating a filter associated with the user login credentials;

retrieving the filter based on the personal filter input and the user login credentials;

filtering the second subset of activity indexes using the filter to determine a third subset of activity indexes; and providing, based on determining the third subset of activity indexes, a third instruction to the user computing device to generate a third GUI presenting the third subset of activity indexes.

12. A method as claim 11 recites, wherein the plurality of inputs includes a request to add or change an insurance policy, the request including an indication of whether the request pertains to business insurance or personal insurance and whether the request pertains to automobile insurance, fire insurance, homeowner's insurance, renters insurance, or life insurance.

13. A method as claim 11 recites, wherein the plurality of inputs includes attributes associated with an insurance product including one or more of personal insurance, business insurance, automobile insurance, homeowner's insurance, renters insurance, or life insurance.

14. A method as claim 11 recites, wherein the filter controls access to work on an insurance product associated with the plurality of inputs.

15. A method as claim 14 recites, wherein determining the second subset of activity indexes comprises filtering the first subset of activity indexes using a primary filter to determine the second subset of activity indexes.

16. A method as claim 11 recites, wherein activities associated with the set of activity indexes include at least one of: obtaining a picture of a vehicle; determining that a registration of a vehicle is up to date; obtaining a risk rating associated with a vehicle owner or driver; obtaining a picture of a business; obtaining a picture of a home; obtaining a picture of a building housing the business or the home; obtaining a fire-safety inspection of the business, the home, or the building housing the business or the home; determining that taxes are not delinquent for the business, the home, or the building housing the business or the home; determining that mortgage payments are not delinquent for the business, the home, or the building housing the business or the home; obtaining a risk rating associated with a business owner, a home owner, a building owner, or a renter; obtaining a picture of an applicant for life insurance; obtaining a medical history associated with the applicant for life insurance; obtain current medical information associated with the applicant for life insurance; or obtaining a risk rating associated with the applicant for life insurance.

17. A method as claim 11 recites, further comprising at least one of:

obtaining a product associated with the role associated with the user login credentials, the product obtained from a second database, wherein the second database associates roles with products;

obtaining a preference associated with the user login credentials in use, the preference obtained from a third database, wherein the third database associates roles with preferences; or obtaining a second filter associated with the user login credentials in use, the second filter obtained from a fourth database, wherein the fourth database associates activities with filters.

18. A method as claim 11 recites, wherein the filter controls access to work on activities from the set of activity indexes based on a user role.

19. A method as claim 11 recites, further comprising:

receiving, via the third GUI, a selection of an activity index of the third subset of activity indexes; and removing the activity index from the set of activity indexes.

* * * * *